United States Patent
Shimizu et al.

(10) Patent No.: US 7,698,042 B2
(45) Date of Patent: Apr. 13, 2010

(54) MOTOR VEHICLE AND CONTROL METHOD OF THE SAME

(75) Inventors: Yasuo Shimizu, Toki (JP); Hideto Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 538 days.

(21) Appl. No.: 11/632,695

(22) PCT Filed: Aug. 30, 2005

(86) PCT No.: PCT/JP2005/016192

§ 371 (c)(1),
(2), (4) Date: Jan. 18, 2007

(87) PCT Pub. No.: WO2006/028026

PCT Pub. Date: Mar. 16, 2006

(65) Prior Publication Data

US 2007/0213907 A1 Sep. 13, 2007

(30) Foreign Application Priority Data

Sep. 8, 2004 (JP) .............................. 2004-260902

(51) Int. Cl.
*G06F 17/00* (2006.01)

(52) U.S. Cl. .............................. 701/51; 701/36; 701/54; 701/65; 702/154; 475/2; 477/15; 477/16; 477/17; 477/18; 477/19; 477/20

(58) Field of Classification Search ...................... 701/1, 701/22, 36, 51–68, 99–102, 116; 702/127, 702/150, 154; 192/2.5, 218, 219, 219.4, 192/219.5; 280/761; 307/9.1, 10.1
See application file for complete search history.

(56) References Cited

U.S. PATENT DOCUMENTS

| | | | | | |
|---|---|---|---|---|---|
| 3,987,879 | A | * | 10/1976 | Longshore et al. | 192/219.5 |
| 5,170,869 | A | * | 12/1992 | Svab et al. | 192/219.5 |
| 5,429,212 | A | * | 7/1995 | Schlosser | 188/69 |
| 5,526,909 | A | * | 6/1996 | Ohkawa | 192/219.5 |
| 5,807,205 | A | * | 9/1998 | Odaka et al. | 477/29 |
| 5,827,149 | A | * | 10/1998 | Sponable | 477/92 |
| 5,916,062 | A | * | 6/1999 | Siepker | 477/194 |

(Continued)

FOREIGN PATENT DOCUMENTS

DE 195 30 233 A1 2/1997

(Continued)

*Primary Examiner*—Jack W. Keith
*Assistant Examiner*—Jonathan M Dager
(74) *Attorney, Agent, or Firm*—Oliff & Berridge, PLC (57) ABSTRACT

In response to the driver's brake OFF operation after a gearshift operation of a gearshift lever to a parking position, a motor MG2 is controlled to sequentially output a torque in a backward direction of a vehicle and a torque in a forward direction of the vehicle. Gears are accordingly engaged in a parking lock mechanism during rotation of a parking gear by an angle corresponding to half a tooth in the backward direction of the vehicle or during subsequent rotation of the parking gear by an angle corresponding to one tooth in the forward direction of the vehicle. This arrangement effectively ensures gear engagement in the parking lock mechanism, while desirably reducing a moving distance from a vehicle stop position before gear engagement in the parking lock mechanism.

19 Claims, 8 Drawing Sheets

U.S. PATENT DOCUMENTS

| | | | |
|---|---|---|---|
| 5,943,918 A | 8/1999 | Reed, Jr. et al. | |
| 5,954,179 A * | 9/1999 | Osborn | 192/219.5 |
| 6,278,916 B1 * | 8/2001 | Crombez | 701/22 |
| 6,590,299 B2 * | 7/2003 | Kuang et al. | 290/40 C |
| 6,679,810 B1 * | 1/2004 | Boll et al. | 477/195 |
| 6,896,340 B2 * | 5/2005 | Kinser et al. | 303/192 |
| 2001/0042669 A1 * | 11/2001 | Arakawa | 192/219.5 |
| 2002/0040839 A1 * | 4/2002 | Thyselius | 192/219.5 |
| 2002/0104399 A1 * | 8/2002 | Wilson et al. | 74/473.14 |
| 2002/0132702 A1 * | 9/2002 | Muramoto | 477/183 |
| 2003/0060327 A1 * | 3/2003 | Williams et al. | 477/99 |
| 2004/0237694 A1 * | 12/2004 | Lindenschmidt et al. | 74/473.21 |
| 2005/0005723 A1 * | 1/2005 | Pelchen et al. | 74/473.21 |
| 2006/0106520 A1 * | 5/2006 | Bodin et al. | 701/67 |

FOREIGN PATENT DOCUMENTS

| | | | |
|---|---|---|---|
| EP | 0 769 403 A2 | | 4/1997 |
| GB | 2438411 A | * | 11/2007 |
| JP | A 07-285422 | | 10/1995 |
| JP | A 09-170533 | | 6/1997 |
| JP | A 09-286312 | | 11/1997 |
| JP | A 2003-237550 | | 8/2003 |
| JP | A 2003-247438 | | 9/2003 |

* cited by examiner

Forward Direction    Backward Direction (b)

Forward Direction    Backward Direction

MOTOR VEHICLE AND CONTROL METHOD OF THE SAME

TECHNICAL FIELD

The present invention relates to a motor vehicle and a control method of the motor vehicle.

BACKGROUND ART

In one proposed motor vehicle, an engine, a first motor generator, and a second motor generator linked to drive wheels via a reduction gear unit are connected to three rotational elements of a power distribution mechanism. The motor vehicle is equipped with a parking lock mechanism including a parking lock gear that is attached to a rotating shaft of the reduction gear unit, and a parking lock pole that engages with the parking lock gear and locks the drive wheels in a non-rotatable state (see, for example, Japanese Patent Laid-Open Gazette No. H09-170533). In this proposed motor vehicle, in response to the driver's operation of a gearshift lever to a parking position, the gears are engaged in the mechanical parking lock mechanism to lock the drive wheels. In response to a start command of the engine under such conditions, the first motor generator is controlled to output a torque and crank start the engine.

DISCLOSURE OF THE INVENTION

In this proposed motor vehicle, some rotational position of the parking lock gear may interfere with gear engagement in the mechanical parking lock mechanism in response to the gearshift operation of the gearshift lever to the parking position. In this case, application of a force in a longitudinal direction of the vehicle to a drive shaft linked to the drive wheels unexpectedly moves the vehicle in either a forward direction or a backward direction of the vehicle until gear engagement in the mechanical parking lock mechanism. In a motor vehicle with a reactive force applied to the drive shaft at a start of the engine, the engine start in the gear disengagement state of the mechanical parking lock mechanism may cause an unexpected motion of the vehicle.

The motor vehicle and the control method of the motor vehicle of the invention thus aim to ensure gear engagement in a parking lock mechanism. The motor vehicle and the control method of the motor vehicle also aim to reduce a moving distance from a vehicle stop position before gear engagement in the parking lock mechanism. The motor vehicle of the invention with a reactive force applied to a drive shaft at a start of an internal combustion engine aims to prevent an unexpected motion of the vehicle at a start of the internal combustion engine.

At least part of the above and the other related objects is attained by a motor vehicle and a control method of the motor vehicle of the invention having the configurations discussed below.

The present invention is directed to a motor vehicle. The motor vehicle includes: a motor that outputs power to drive the motor vehicle; a locking mechanism including a first gear that is directly or indirectly linked to a specific axle of the motor vehicle and rotates with rotation of the specific axle, and a second gear that engages with the first gear and locks the specific axle in a non-rotatable state, and the locking mechanism causing the second gear to engage with the first gear in response to a driver's gearshift operation of a gearshift lever to a parking position; and a parking control module that executes a parking control after the driver's gearshift operation of the gearshift lever to the parking position, the parking control controlling the motor to sequentially output a torque for moving the motor vehicle in one of forward and backward directions by or over a first distance and a torque for moving the motor vehicle in the other of the forward and backward directions by or over a second distance.

In the motor vehicle of the invention, the driver's gearshift operation of the gearshift lever to the parking position causes the second gear to engage with the first gear, which is linked to the specific axle and rotates with the rotation of the specific axle, and accordingly lock the specific axle in the non-rotatable state. After this gearshift operation to the parking position, the motor is controlled to sequentially output the torque for moving the motor vehicle in one of the forward and the backward directions by or over the first distance and the torque for moving the motor vehicle in the other of the forward and backward directions by or over the second distance. The sequential output of the torque for moving the motor vehicle in one of the forward and the backward directions by or over the first distance and the torque for moving the motor vehicle in the other of the forward and backward directions by or over the second distance effectively ensure engagement of the second gear with the first gear with a certain motion of the vehicle in the longitudinal direction of the vehicle. Namely this arrangement ensures effective gear engagement in the locking mechanism.

In the motor vehicle of the invention, for example, the parking control module may execute the parking control with settings of a distance corresponding to half a tooth of the first gear and a distance corresponding to one tooth of the first gear to the first distance and to the second distance. In another example, the parking control module may execute the parking control with settings of a preset torque for a predetermined first time period and the preset torque for a predetermined second time period to the torque for moving the motor vehicle by or over the first distance and to the torque for moving the motor vehicle by or over the second distance. This arrangement desirably reduces a moving distance from a vehicle stop position before gear engagement in the locking mechanism.

In one preferable embodiment of the motor vehicle of the invention, the parking control module detects a lock of the specific axle by engagement of the first gear with the second gear during execution of the parking control and terminates the parking control in response to detection of a lock of the specific axle. This arrangement desirably prevents the motor from outputting any unnecessary torque after detection of the lock of the specific axle. In this case, the motor vehicle may further include: a vehicle speed measurement unit that measures a vehicle speed of the motor vehicle, and the parking control module may detect the lock of the specific axle when the vehicle speed measured by the vehicle speed measurement unit decreases below a preset reference level during output of the torque for moving the motor vehicle by or over the first distance or during output of the torque for moving the motor vehicle by or over the second distance. Also, the motor vehicle may further includes: a rotational angle detection unit that detects a rotational angle of a drive shaft, which is connected to either the specific axle or a different axle from the specific axle, and the parking control module may detect the lock of the specific axle when the rotational angle of the drive shaft detected by the rotational angle detection unit is kept unchanged in a preset angle range during output of the torque for moving the motor vehicle by or over the first distance or during output of the torque for moving the motor vehicle by or over the second distance.

In another preferable embodiment of the motor vehicle of the invention, the parking control module may execute the parking control after the driver's brake off operation subsequent to the driver's gearshift operation of the gearshift lever to the parking position. The motor vehicle may further include: a second motor that outputs power to a different axle from the specific axle of receiving the power output from the motor, and the parking control module may execute the parking control to control the second motor, instead of the motor. Also, the motor vehicle may further include: a second motor that outputs power to a different axle from the specific axle of receiving the power output from the motor, and the parking control module may execute the parking control to control the second motor, in addition to the motor.

In still another preferable embodiment of the motor vehicle of the invention, the motor vehicle may further include: an internal combustion engine; an electric power-mechanical power input output mechanism that is connected to an output shaft of the internal combustion engine and to a drive shaft linked with either the specific axle of the motor vehicle or a different axle from the specific axle and outputs at least part of power of the internal combustion engine to the drive shaft through input and output of electric power and mechanical power; and a start control module that, in response to a start command of the internal combustion engine, controls the electric power-mechanical power input output mechanism and the internal combustion engine to start the internal combustion engine with output of power from the electric power-mechanical power input output mechanism, and the parking control module may execute the parking control, prior to a start of the internal combustion engine by the start control module. In this case, the electric power-mechanical power input output mechanism may include: a three shaft-type power input output module that is linked to three shafts, that is, the output shaft of the internal combustion engine, the drive shaft, and a third shaft, and automatically determines power input from and output to a residual one shaft based on powers input from and output to any two shafts among the three shafts; and a generator that inputs and outputs power from and to the third shaft. Further, the electric power-mechanical power input output mechanism may include a pair-rotor motor that has a first rotor connected to the output shaft of the internal combustion engine and a second rotor connected to the drive shaft and is driven through relative rotation of the first rotor to the second rotor.

In still another preferable embodiment of the motor vehicle of the invention, the motor vehicle may further include: an internal combustion engine; an electric power-mechanical power input output mechanism that is connected to an output shaft of the internal combustion engine and to a drive shaft linked with either the specific axle of the motor vehicle or a different axle from the specific axle and outputs at least part of power of the internal combustion engine to the drive shaft through input and output of electric power and mechanical power; and a start control module that, in response to a start command of the internal combustion engine, instructs the parking control module to execute the parking control and controls the electric power-mechanical power input output mechanism and the internal combustion engine after conclusion of the parking control to start the internal combustion engine with output of power from the electric power-mechanical power input output mechanism. In this case, the electric power-mechanical power input output mechanism may include: a three shaft-type power input output module that is linked to three shafts, that is, the output shaft of the internal combustion engine, the drive shaft, and a third shaft, and automatically determines power input from and output to a residual one shaft based on powers input from and output to any two shafts among the three shafts; and a generator that inputs and outputs power from and to the third shaft. Also, the electric power-mechanical power input output mechanism may further include a pair-rotor motor that has a first rotor connected to the output shaft of the internal combustion engine and a second rotor connected to the drive shaft and is driven through relative rotation of the first rotor to the second rotor.

The present invention is also directed to a control method of a motor vehicle. The motor vehicle includes: a motor that outputs power to drive the motor vehicle; and a locking mechanism including a first gear that is directly or indirectly linked to a specific axle of the motor vehicle and rotates with rotation of the specific axle, and a second gear that engages with the first gear and locks the specific axle in a non-rotatable state, and the locking mechanism causing the second gear to engage with the first gear in response to a driver's gearshift operation of a gearshift lever to a parking position. The control method of the motor vehicle executes a parking control after the driver's gearshift operation of the gearshift lever to the parking position, and the parking control controlls the motor to sequentially output a torque for moving the motor vehicle in one of forward and backward directions by or over a first distance and a torque for moving said motor vehicle in the other of the forward and backward directions by or over a second distance.

In the control method of the motor vehicle of the invention, the driver's gearshift operation of the gearshift lever to the parking position causes the second gear to engage with the first gear, which is linked to the specific axle and rotates with the rotation of the specific axle, and accordingly lock the specific axle in the non-rotatable state. After this gearshift operation to the parking position, the motor is controlled to sequentially output the torque for moving the motor vehicle in one of the forward and the backward directions by or over the first distance and the torque for moving the motor vehicle in the other of the forward and backward directions by or over the second distance. The sequential output of the torque for moving the motor vehicle in one of the forward and the backward directions by or over the first distance and the torque for moving the motor vehicle in the other of the forward and backward directions by or over the second distance effectively ensure engagement of the second gear with the first gear with a certain motion of the vehicle in the longitudinal direction of the vehicle. Namely this arrangement ensures effective gear engagement in the locking mechanism.

In the control method of the motor vehicle of the invention, for example, the parking control may be executed with settings of a distance corresponding to half a tooth of the first gear and a distance corresponding to one tooth of the first gear to the first distance and to the second distance. In another example, the parking control may be executed with settings of a preset torque for a predetermined first time period and the preset torque for a predetermined second time period to the torque for moving the motor vehicle by or over the first distance and to the torque for moving the motor vehicle by or over the second distance. In one preferable embodiment of the invention, the control method may include the step of: detecting a lock of the specific axle by engagement of the first gear with the second gear during execution of the parking control and terminating the parking control in response to detection of a lock of the specific axle.

BEST MODE OF CARRYING OUT THE INVENTION

Figure 1:
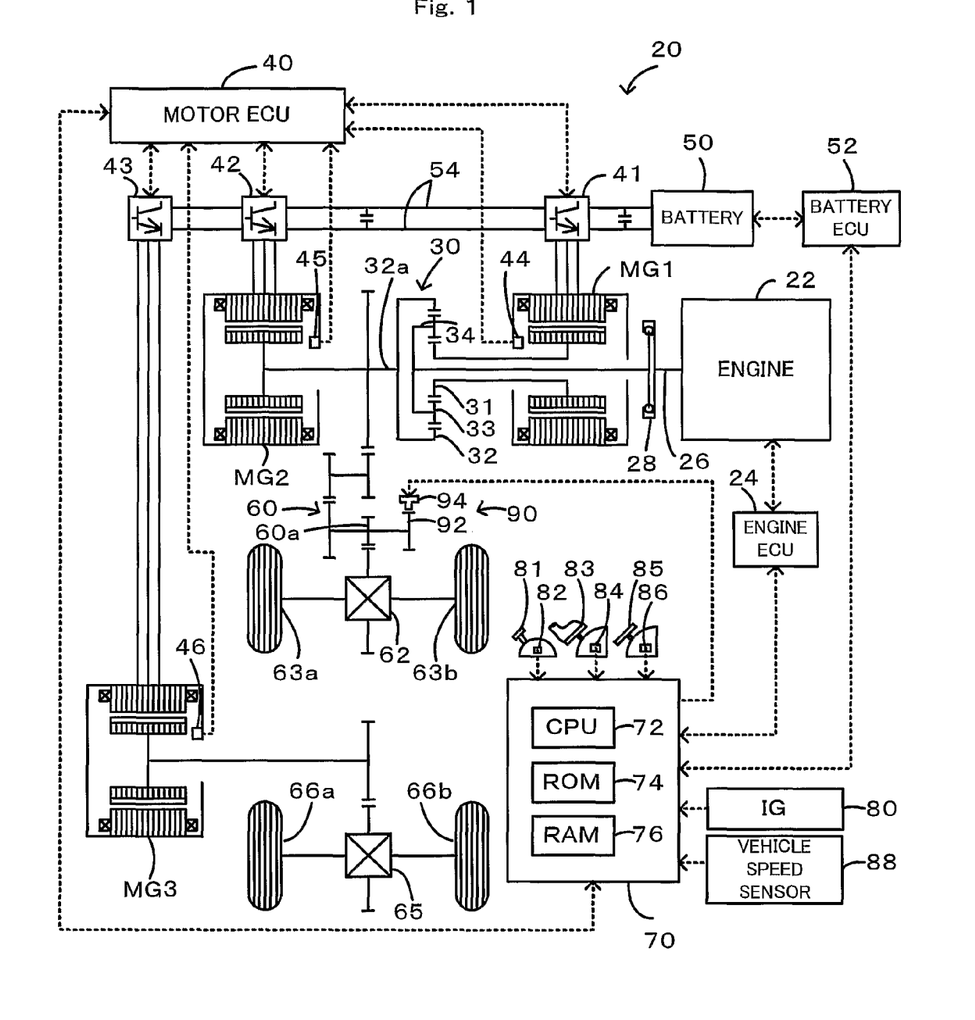
FIG. 1 schematically illustrates the configuration of a hybrid vehicle in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is connected to a crankshaft 26 or an output shaft of the engine 22 via a damper 28, a motor MG1 that is connected to the power distribution integration mechanism 30 and is capable of generating electric power, a motor MG2 that is connected to the power distribution integration mechanism 30 and is linked to front wheels 63a and 63b via a differential gear 62, a motor MG3 that is linked to rear wheels 66a and 66b via a differential gear 65, and a hybrid electronic control unit 70 that controls the operations of the whole hybrid vehicle 20.

The engine 22 is an internal combustion engine that consumes a hydrocarbon fuel, such as gasoline or light oil, to output power. An engine electronic control unit (hereafter referred to as engine ECU) 24 receives signals representing the driving conditions of the engine 22 from various sensors and controls the operations of the engine 22 to implement, for example, fuel injection control, ignition control, and intake air flow regulation. The engine ECU 24 establishes communication with the hybrid electronic control unit 70 to drive and control the engine 22 in response to control signals received from the hybrid electronic control unit 70, while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the motor MG2 via a ring gear shaft 32a. When the motor MG1 functions as a generator, the power of the engine 22 input through the carrier 34 is distributed into the sun gear 31 and the ring gear 32 corresponding to their gear ratio. When the motor MG1 functions as a motor, on the other hand, the power of the engine 22 input through the carrier 34 is integrated with the power of the motor MG1 input through the sun gear 31 and is output to the ring gear 32. The power output to the ring gear 32 is transmitted to the front wheels 63a and 63b via the ring gear shaft 32a, the gear mechanism 60, and the differential gear 62.

The gear mechanism 60 is joined with a parking lock mechanism 90, which includes a parking gear 92 that is attached to a final gear 60a, and a parking lock pole 94 that engages with the parking gear 92 to lock the parking gear 92 in a non-rotatable state. The parking lock pole 94 is activated when the hybrid electronic control unit 70 actuates and controls an actuator (not shown) in response to detection of a gearshift signal from another gear position to a parking position (P position) or a gearshift signal from the P position to another gear position. The parking lock pole 94 engages with and disengages from the parking gear 92 to activate and release the parking lock. The final gear 60a is mechanically linked to the front wheels 63a and 63b. The parking lock mechanism 90 thus indirectly locks the front wheels 63a and 63b.

The motors MG1, MG2, and MG3 are all constructed as known synchronous motor generators that may be actuated both as a generator and as a motor. The motors MG1, MG2, and MG3 transmit electric powers to and from a battery 50 via inverters 41, 42, and 43. Power lines 54 connecting the battery 50 with the inverters 41, 42, and 43 are structured as common positive bus and negative bus shared by the inverters 41, 42, and 43. Such connection enables electric power generated by any one of the motors MG1, MG2, and MG3 to be consumed by another motor. The battery 50 may thus be charged with surplus electric power generated by any one of the motors MG1, MG2, and MG3, while being discharged to supplement insufficient electric power. The battery 50 is neither charged nor discharged, while the input and output of electric powers are balanced among the motors MG1, MG2, and MG3. All the motors MG1, MG2, and MG3 are driven and controlled by a motor electronic control unit (hereafter referred to as motor ECU) 40. The motor ECU 40 inputs signals required for driving and controlling the motors MG1, MG2, and MG3, for example, signals representing rotational positions θ1, θ2, and θ3 of rotors in the motors MG1, MG2, and MG3 from rotational position detection sensors 44, 45, and 46 and signals representing phase currents to be applied to the motors MG1, MG2, and MG3 from current sensors (not shown). The motor ECU 40 outputs switching control signals to the inverters 41, 42, and 43. The motor ECU 40 executes a rotation speed computation routine (not shown) to calculate rotation speeds Nm1, Nm2, and Nm3 of the rotors of the motors MG1, MG2, and MG3 and a rotation speed Nr of the ring gear shaft 32a from the input signals from the rotational position detection sensors 44, 45, and 46. The motor ECU 40 establishes communication with the hybrid electronic control unit 70 to drive and control the motors MG1, MG2, and MG3 in response to control signals received from the hybrid electronic control unit 70, while outputting data regarding the driving conditions of the motors MG1, MG2, and MG3 to the hybrid electronic control unit 70 according to the requirements.

The battery 50 is under control of a battery electronic control unit (hereafter referred to as battery ECU) 52. The batter ECU 52 inputs signals required for management of the battery 50, for example, an inter-terminal voltage Vb from a voltage sensor (not shown) located between terminals of the battery 50, a charge-discharge current Ib from a current sensor (not shown) located in the power line 54 connecting with an output terminal of the battery 50, and a battery temperature Tb from a temperature sensor (not shown) attached to the battery 50. The battery ECU 52 outputs data regarding the conditions of the battery 50 to the hybrid electronic control unit 70 by communication according to the requirements. For management of the battery 50, the battery ECU 52 computes a remaining charge level or current state of charge (SOC) of the battery 50 from an integration of the charge-discharge current measured by the current sensor (not shown).

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP currently set by a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V in the longitudinal direction of the hybrid vehicle 20 from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

Figure 2:
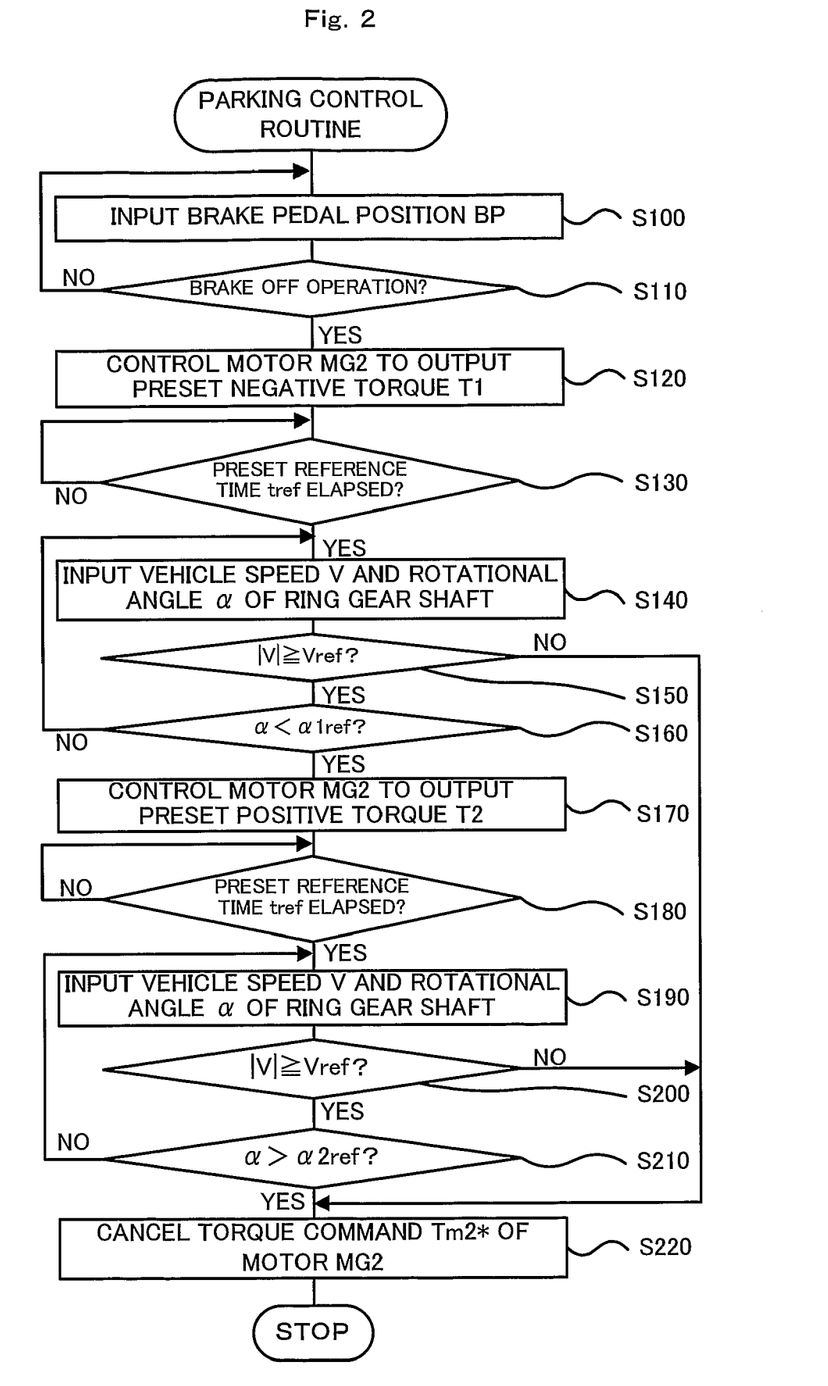
FIG. 2 is a flowchart showing a parking control routine executed by a hybrid electronic control unit included in the hybrid vehicle of FIG. 1.

The following description regards the operations of the hybrid vehicle 20 of the embodiment configured as discussed above, especially a series of control in gear engagement of the parking lock mechanism 90. FIG. 2 is a flowchart showing a parking control routine executed by the hybrid electronic control unit 70. This control routine is triggered by a gearshift operation of the gearshift lever 81 to the P position after a stop of the vehicle.

In the parking control routine, the CPU 72 of the hybrid electronic control unit 70 first inputs the brake pedal position BP from the brake pedal position sensor 86 (step S100), and waits for a brake OFF operation, which makes the input brake pedal position BP equal to 0% (step S110).

In response to the brake OFF operation, the motor MG2 is driven and controlled to output a preset negative torque T1 (step S120). In the concrete procedure of driving and controlling the motor MG2, the CPU 72 sends the preset negative torque T1 as a torque command Tm2* of the motor MG2 to the motor ECU 40. The motor ECU 40 executes switching control of switching elements of the inverter 42 to drive the motor MG2 with the received torque command Tm2*. The negative torque T1 is set as a torque of rotating the ring gear shaft 32a and the parking gear 92 indirectly connected to the ring gear shaft 32a in a backward direction of the hybrid vehicle 20. The negative torque T1 is set to a level that does not make the driver feel a motion of the vehicle, and depends upon the characteristics of the motor MG2. The processing of step S102 controls the motor MG2 to output the preset negative torque T1 and accordingly rotates the ring gear shaft 32a and the parking gear 92 in the backward direction of the vehicle.

After elapse of a preset reference time tref (step S130) the CPU 72 inputs the vehicle speed V from the vehicle speed sensor 88 and a rotational angle α of the ring gear shaft 32a relative to the position at a vehicle stop time (step S140). The reference time tref is set equal to or slightly longer than a time period required for detection of the vehicle speed V by the vehicle speed sensor 88 after a start of output of the preset negative torque T1 from the motor MG2. The reference time tref is set to, for example, several ten or several hundred msec. The rotational angle α of the ring gear shaft 32a is computed from a current rotational position θ2 of the rotor of the motor MG2 detected by the rotational position detection sensor 45 and a vehicle stop-time rotational position θ2 detected at the vehicle stop time and is received from the motor ECU 40 by communication. The rotational angle α of the ring gear shaft 32a has positive values in the forward direction of the vehicle and negative values in the backward direction of the vehicle.

Figure 3:
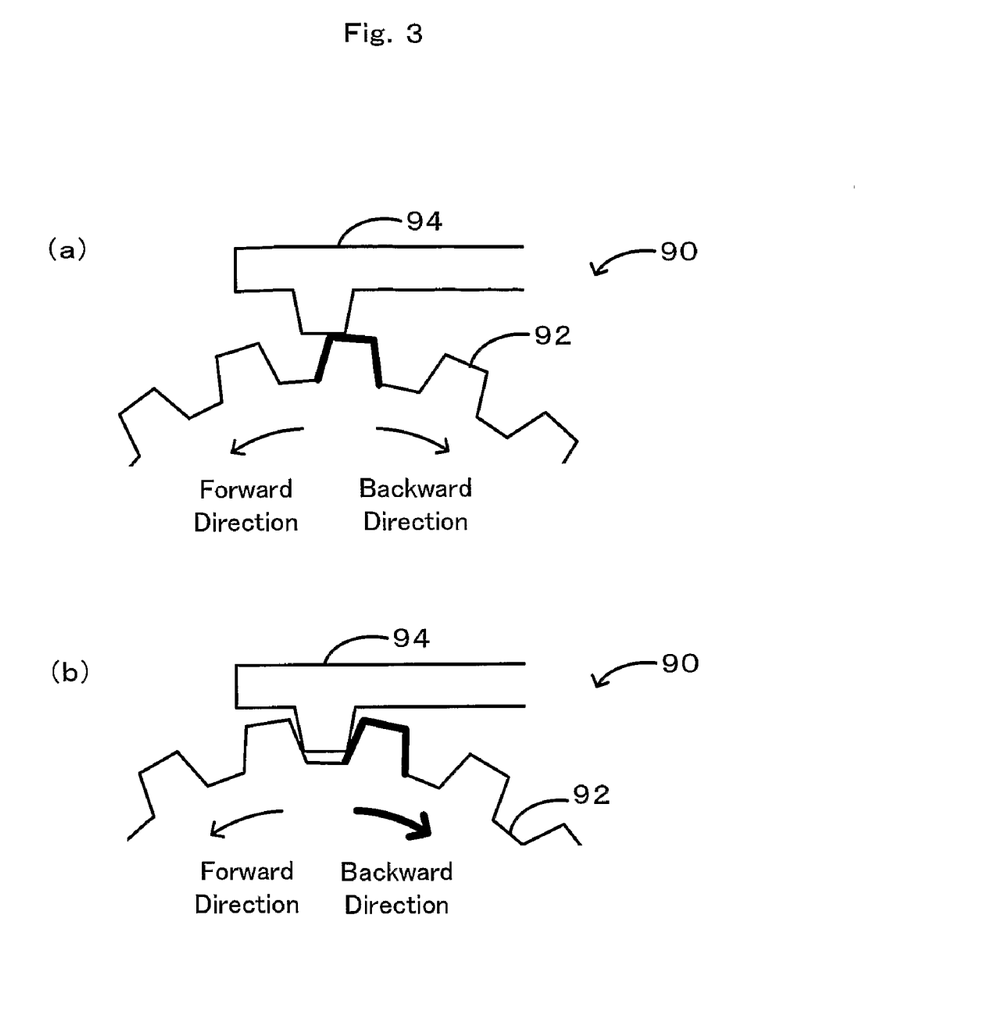
FIG. 3 shows gear engagement in a parking lock mechanism.

The CPU 72 then compares the absolute value of the input vehicle speed V with a preset reference speed Vref (step S150). When the absolute value of the input vehicle speed V is not lower than the preset reference speed Vref, the CPU 72 subsequently compares the input rotational angle α of the ring gear shaft 32a with a preset reference angle α1ref (step S160). When the input rotational angle α is not less than the preset reference angle α1ref, the parking control routine goes back to step S140. The reference speed Vref is used as a criterion of determining whether gears are engaged in the parking lock mechanism 90 to stop the vehicle, and is set to a positive value close to 0. The reference angle α1ref is used as a criterion of determining whether the ring gear shaft 32a is rotated relative to the position at the vehicle stop time by an angle corresponding to half a tooth of the parking gear 92 in the backward direction of the vehicle. The reference angle α1ref depends upon the size and the number of teeth of the parking gear 92 and the gear ratio of the gear mechanism 60. The processing of steps S120 through S160 causes the motor MG2 to output the preset negative torque T1, so as to rotate the parking gear 92 in the backward direction of the vehicle and engage the gears in the parking lock mechanism 90. When the absolute value of the vehicle speed V decreases below the preset reference speed Vref before the rotational angle α of the ring gear shaft 32a becomes less than the preset reference angle α1ref, the CPU 72 determines that the gears are engaged in the parking lock mechanism 90 to stop the hybrid vehicle 20. The parking control routine accordingly cancels the torque command Tm2* of the motor MG2 (step S220) before being terminated. Gear engagement in the parking lock mechanism 90 under such conditions is shown in FIG. 3. FIG. 3(a) shows the state of the parking lock mechanism 90 when the driver stops the vehicle and operates the gearshift lever 81 to the P position. FIG. 3(b) shows the state of the parking lock mechanism 90, where the parking gear 92 is rotated in the backward direction of the vehicle from the state of FIG. 3(a) to engage with the parking lock pole 94. In the state of FIG. 3(a), the gears are not engaged in the parking lock mechanism 90, in response to the driver's gearshift operation of the gearshift lever 81 to the P position. After the brake OFF operation, the motor MG2 is controlled to output the preset negative torque T1 and rotate the parking gear 92 in the backward direction of the vehicle. This attains gear engagement in the parking lock mechanism 90 as shown in FIG. 3(b). When the gear engagement in the parking lock mechanism 90 is attained in response to the driver's gearshift operation of the gearshift lever 81 to the P position, the vehicle is kept at a stop even after elapse of the preset reference time tref since the start of the output of the preset negative torque T1 from the motor MG2. The vehicle speed V is thus substantially equal to 0, and the control routine cancels the torque command Tm2* of the motor MG2.

Figure 4:
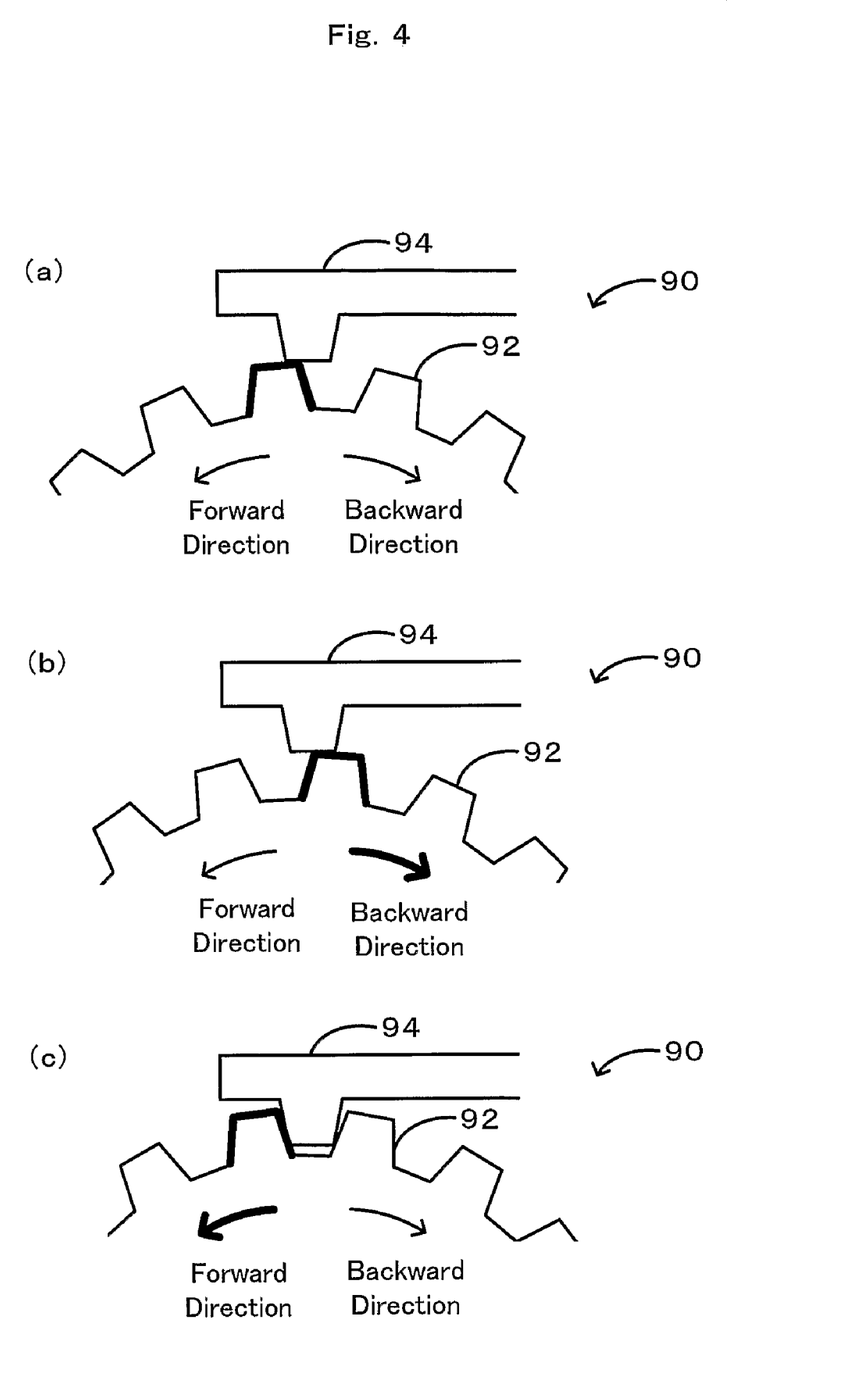
FIG. 4 shows gear engagement in the parking lock mechanism.

When the rotational angle α of the ring gear shaft 32a becomes less than the preset reference angle α1ref, prior to a decrease in absolute value of the vehicle speed V below the preset reference speed Vref, the gears are not engaged in the parking lock mechanism 90. The ring gear shaft 32a is rotated relative to the position at the vehicle stop time by the angle corresponding to half a tooth of the parking gear 92 in the backward direction of the vehicle. In this case, the CPU 72 drives and controls the motor MG2 to output a preset positive torque T2 (step S170) and executes the processing of steps S180 through S210, which is identical with the processing of steps S130 through S160. After elapse of the preset reference time tref (step S180), the CPU 72 inputs the vehicle speed V and the rotational angle α of the ring gear shaft 32a (step S190), compares the absolute value of the input vehicle speed V with the preset reference speed Vref (step S200), and, when the absolute value of the vehicle speed V is not lower than the preset reference speed Vref, further compares the input rotational angle α with a preset reference angle α2ref (step S210). The parking control routine goes back to step S190 when the rotational angle α is not less than the preset reference angle α2ref. The positive torque T2 is set as a torque of rotating the ring gear shaft 32a and the parking gear 92 in a forward direction of the hybrid vehicle 20, on the contrary to the negative torque T1. In this embodiment, the positive torque T2 is set equal to a value (−T1) with the reverse sign of the preset negative torque T1. The reference angle α2ref is used as a criterion of determining whether the ring gear shaft 32a is rotated relative to the position at the processing time of step S170 by an angle corresponding to one tooth of the parking gear 92 in the forward direction of the vehicle. This determines whether the ring gear shaft 32a is rotated relative to the position at the vehicle stop time by an angle corresponding to half a tooth of the parking gear 92 in the forward direction of the vehicle. In this embodiment, the reference angle α2ref is set equal to a value (−α1ref) with the reverse sign of the preset reference angle α1ref. The processing of steps S170 through S210 causes the motor MG2 to output the preset positive torque T2, so as to rotate the parking gear 92 in the forward direction of the vehicle and engage the gears in the parking lock mechanism 90. When the absolute value of the vehicle speed V decreases below the preset reference speed Vref before the rotational angle α of the ring gear shaft 32a becomes greater than the preset reference angle α2ref, the CPU 72 determines that the gears are engaged in the parking lock mechanism 90 to stop the hybrid vehicle 20. The parking control routine accordingly cancels the torque command Tm2* of the motor MG2 (step S220) before being terminated. Gear engagement in the parking lock mechanism 90 under such conditions is shown in FIG. 4. FIG. 4(a) shows the state of the parking lock mechanism 90 when the driver stops the vehicle and operates the gearshift lever 81 to the P position. FIG. 4(b) shows the state of the parking lock mechanism 90, where the parking gear 92 is rotated in the backward direction of the vehicle by an angle corresponding to half a tooth from the state of FIG. 4(a). FIG. 4(c) shows the state of the parking lock mechanism 90, where the parking gear 92 is rotated in the forward direction of the vehicle from the state of FIG. 4(b) to engage with the parking lock pole 94. In the state of FIG. 4(b), even when the motor MG2 is controlled to output the preset negative torque T1 and rotate the parking gear 92 by an angle corresponding to half a tooth in the backward direction of the vehicle, the gears are not engaged in the parking lock mechanism 90 (steps S120 to S160) The motor MG2 is then controlled to output the preset positive torque T2 and rotate the parking gear 92 in the forward direction of the vehicle. This attains gear engagement in the parking lock mechanism 90 (steps S170 to S210) as shown in FIG. 4(c). Gear engagement in the parking lock mechanism 90 thus attains while the vehicle moves from the vehicle stop position in the longitudinal direction of the vehicle by a distance corresponding to half a tooth of the parking gear 92. This structure of the embodiment desirably reduces the moving distance from the vehicle stop position, compared with the conventional structure of rotating the parking gear 92 in only one of the forward and the backward directions of the vehicle to attain gear engagement in the parking lock mechanism 90. The torque command Tm2* of the motor MG2 is cancelled on gear engagement in the parking lock mechanism 90. Such cancellation desirably prevents the motor MG2 from outputting any unnecessary torque after gear engagement in the parking lock mechanism 90. The gear engagement of the parking lock mechanism 90 is attained during rotation of the parking gear 92 by an angle corresponding to one tooth in one of the forward and the backward directions of the vehicle. The absolute value of the vehicle speed V accordingly decreases below the preset reference speed Vref before the rotational angle α becomes greater than the preset reference angle α2ref.

In the hybrid vehicle 20 of the embodiment described above, in response to a brake OFF operation after a gearshift operation of the gearshift lever 81 to the P position, the motor MG2 is controlled to sequentially output the preset negative torque T1 and the preset positive torque T2. The gears are accordingly engaged in the parking lock mechanism 90 during rotation of the parking gear 92 by an angle corresponding to half a tooth in the backward direction of the vehicle or during subsequent rotation of the parking gear 92 by an angle corresponding to one tooth in the forward direction of the vehicle. This arrangement ensures effective gear engagement in the parking lock mechanism 90. Gear engagement in the parking lock mechanism 90 attains while the vehicle moves from the vehicle stop position in the longitudinal direction of the vehicle by a distance corresponding to half a tooth of the parking gear 92. This arrangement desirably reduces the moving distance from the vehicle stop position. In the hybrid vehicle 20 of the embodiment, the torque command Tm2* of the motor MG2 is cancelled on gear engagement in the parking lock mechanism 90. Such cancellation desirably prevents the motor MG2 from outputting any unnecessary torque after gear engagement in the parking lock mechanism 90 to stop the vehicle.

In the hybrid vehicle 20 of the embodiment, the motor MG2 is controlled to start torque output in response to the driver's brake OFF operation after a gearshift operation of the gearshift lever 81 to the P position. The torque output from the motor MG2 may start when the driver's depression amount of the brake pedal 85 becomes less than a preset level (for example, the brake pedal position BP=50%). The torque output from the motor MG2 may otherwise start in response to the driver's gearshift operation of the gearshift lever to the P position, regardless of the depression amount of the brake pedal 85.

In the hybrid vehicle 20 of the embodiment, the motor MG2 is controlled to sequentially output the preset negative torque T1 and the preset positive torque T2. The gears are accordingly engaged in the parking lock mechanism 90 during rotation of the parking gear 92 by an angle corresponding to half a tooth in the backward direction of the vehicle or during subsequent rotation of the parking gear 92 by an angle corresponding to one tooth in the forward direction of the vehicle. In one possible modification, the motor MG2 may be controlled to sequentially output the preset positive torque T2 and the preset negative torque T1. In this modified structure, the gears are engaged in the parking lock mechanism 90 during rotation of the parking gear 92 by an angle corresponding to half a tooth in the forward direction of the vehicle or during subsequent rotation of the parking gear 92 by an angle corresponding to one tooth in the backward direction of the vehicle.

In the hybrid vehicle 20 of the embodiment, the motor MG2 is controlled to sequentially output the preset negative torque T1 and the preset positive torque T2. The gears are accordingly engaged in the parking lock mechanism 90 during rotation of the parking gear 92 by an angle corresponding to half a tooth in the backward direction of the vehicle or during subsequent rotation of the parking gear 92 by an angle corresponding to one tooth in the forward direction of the vehicle. The rotational angle is not restricted to half a tooth or one tooth. The gears may be engaged in the parking lock mechanism 90 during rotation of the parking gear 92 by an angle of or over half a tooth in the backward direction of the vehicle or during subsequent rotation of the parking gear 92 by an angle of or over one tooth in the forward direction of the vehicle.

In the hybrid vehicle 20 of the embodiment, the preset negative torque T1 and the preset positive torque T2 have an identical magnitude. The preset negative torque T1 and the preset positive torque T2 may, however, have different magnitudes.

In the hybrid vehicle 20 of the embodiment, the preset reference time tref at step S130 is identical with the preset reference time tref at step S180 in the parking control routine of FIG. 2. These reference times may, however, be set to different values.

Figure 5:
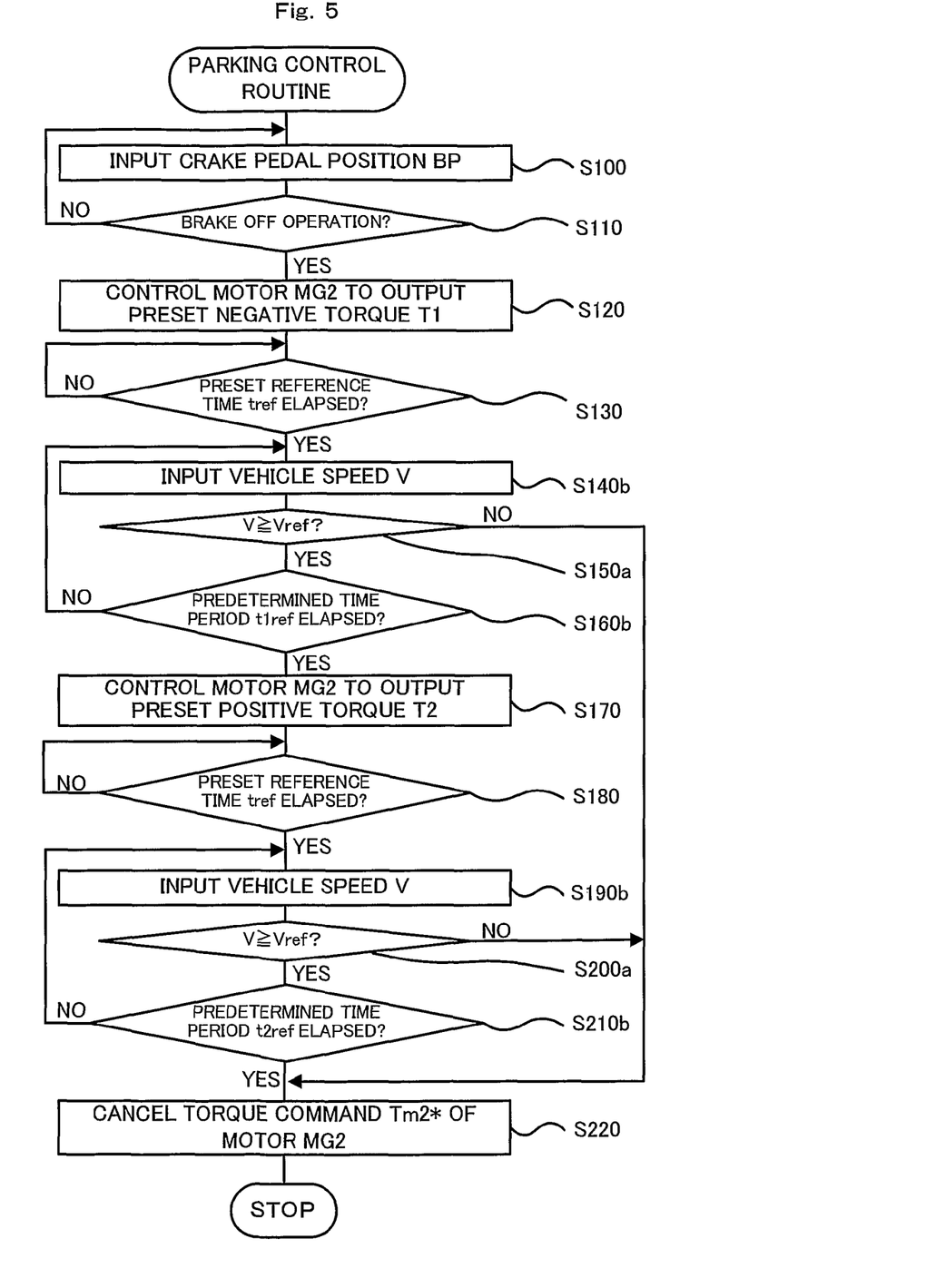
FIG. 5 is a flowchart showing a modified parking control routine.

In the hybrid vehicle 20 of the embodiment, the motor MG2 is controlled to output the preset negative torque T1 until the rotational angle α of the ring gear shaft 32a becomes less than the preset reference angle α1ref after the driver's brake OFF operation. The motor MG2 is then controlled to output the preset positive torque T2 until the rotational angle α becomes greater than the preset reference angle α2ref. One modified procedure may control the motor MG2 to output the preset negative torque T1 for a predetermined time period t1ref after the driver's brake OFF operation and subsequently output the preset positive torque T2 for another predetermined time period t2ref. This modification is described according to a modified parking control routine shown in the flowchart of FIG. 5. In this modified parking control routine of FIG. 5, the comparison between the rotational angle α and the preset reference angle α1ref at step S160 in the parking control routine of FIG. 2 is replaced by wait for elapse of the predetermined time period t1ref at step S160b. Similarly the comparison between the rotational angle α and the preset reference angle α2ref at step S210 in the parking control routine of FIG. 2 is replaced by wait for elapse of the predetermined time period t2ref at step S210b. Accompanied with these changes, the CPU 72 inputs only the vehicle speed V at steps S140b and S190b and compares the vehicle speed V with the preset reference speed Vref at steps S150a and S200a. The time period t1ref is set to output the preset negative torque T1 from the motor MG2 and thereby rotate the parking gear 92 by an angle corresponding to half a tooth in the backward direction of the vehicle. The time period t1ref depends upon the preset negative torque T1, the size and the number of teeth of the parking gear 92, and the gear ratio of the gear mechanism 60. The time period t2ref is set to output the preset positive torque T2 from the motor MG2 and thereby rotate the parking gear 92 by an angle corresponding to one tooth in the forward direction of the vehicle. The time period t2ref also depends upon the preset negative torque T1, the size and the number of teeth of the parking gear 92, and the gear ratio of the gear mechanism 60. In this modified example, the time periods t1ref and t2ref may be set by further taking into account the road surface gradient at the vehicle stop position and the vehicle weight.

Figure 6:
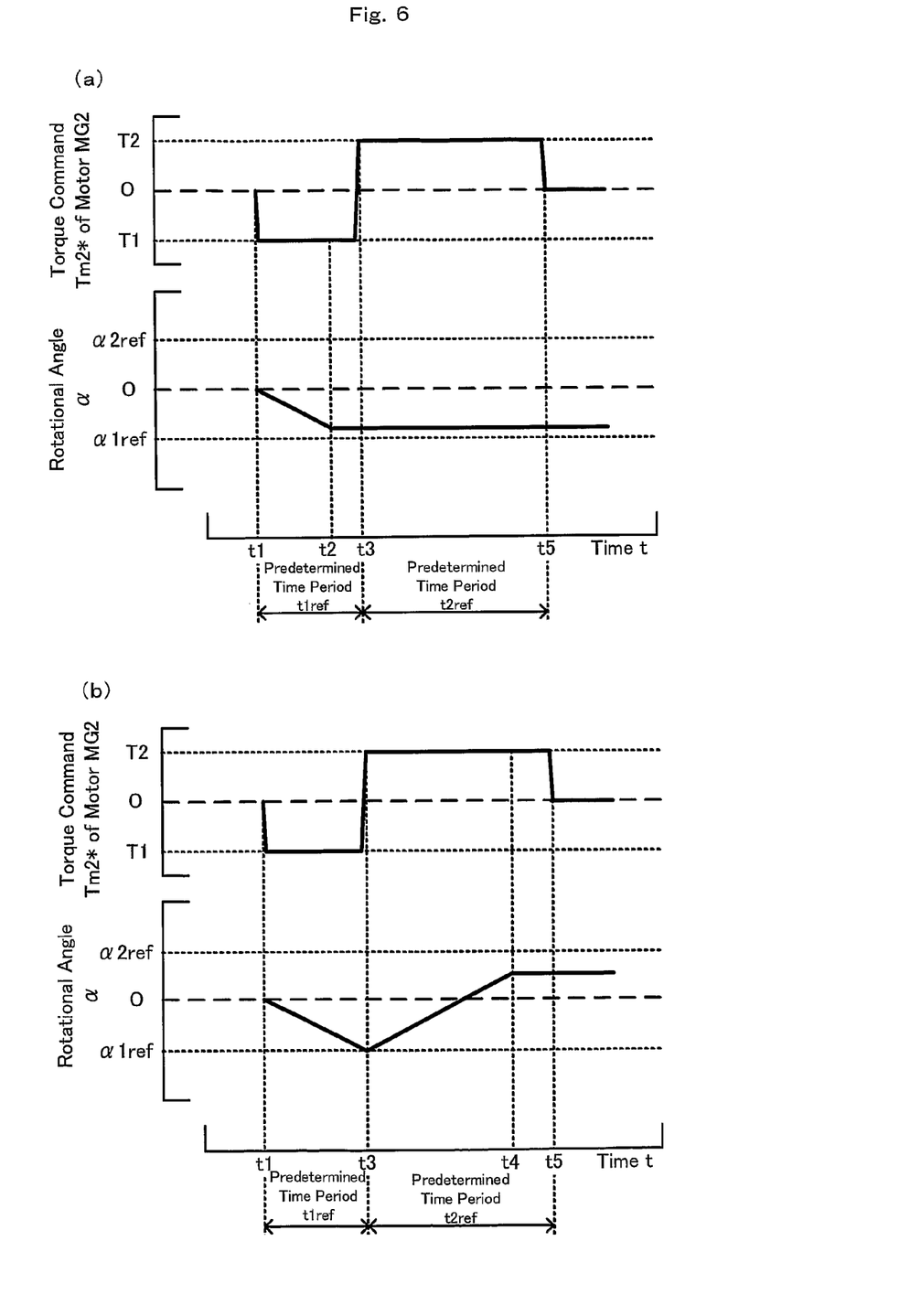
FIG. 6 shows time variations in torque command Tm2* of a motor MG2 and in rotational angle α of a ring gear shaft.

In the hybrid vehicle 20 of the embodiment, the gear engagement or disengagement in the parking lock mechanism 90 is determined according to the absolute value of the vehicle speed V. The determination of gear engagement may be excluded when not required. In this modification, the processing of steps S130 to S150 and the processing of steps S180 to S200 are omitted from the parking control routine of FIG. 5. In the modified flow, in response to the driver's brake OFF operation (step S110), the motor MG2 is driven and controlled to output the preset negative torque T1 for the predetermined time period t1ref (steps S120 and S160b). The motor MG2 is subsequently driven and controlled to output the preset positive torque T2 for the predetermined time period t2ref (steps S170 and S210b). The modified parking control routine then cancels the torque command Tm2* of the motor MG2 (step S220) and is terminated. FIG. 6 shows time variations of the torque command Tm2* of the motor MG2 and the rotational angle α of the ring gear shaft 32a. In the state of FIG. 6(a), the motor MG2 is controlled to start output of a negative torque at a time point t1. The ring gear shaft 32a is then rotated in the backward direction of the vehicle and stops its rotation on gear engagement in the parking lock mechanism 90 at a time point t2. The ring gear shaft 32a keeps stopping its rotation after the time point t2 even when the motor MG2 outputs a positive torque or a negative torque. In the state of FIG. 6(b), on the other hand, gear engagement in the parking lock mechanism 90 is not attained during the predetermined time period t1ref after start of the output of the negative torque from the motor MG2 at the time point t1. The motor MG2 is then controlled to start output of a positive torque at a time point t3. The ring gear shaft 32a is accordingly rotated in the forward direction of the vehicle and stops its rotation on gear engagement in the parking lock mechanism 90 at a time point t4. In either case, the torque output from the motor MG2 is terminated at a time point t5 after the gear engagement in the parking lock mechanism 90. In this modified example, the motor MG2 is controlled to sequentially output the preset negative torque T1 for the time period allowing rotation of the parking gear 92 by an angle corresponding to half a tooth in the backward direction of the vehicle and the preset positive torque T2 for the time period allowing subsequent rotation of the parking gear 92 by an angle corresponding to one tooth in the forward direction of the vehicle. This arrangement effectively ensures gear engagement in the parking lock mechanism 90 and desirably reduces the moving distance from the vehicle stop position before gear engagement in the parking lock mechanism 90.

In the hybrid vehicle 20 of the embodiment, the gear engagement or disengagement in the parking lock mechanism 90 is determined according to the vehicle speed V. One modified procedure may determine the gear engagement or disengagement according to the rotational angle α of the ring gear shaft 32a as the drive shaft or according to a rotational angle αp of a rotating shaft of the parking gear 92. In the former case, one applicable procedure may determine the gear engagement when a variation Δα in rotational angle α of the ring gear shaft 32a becomes less than a preset reference level Δαref, which is used as a criterion of determining whether gears are engaged in the parking lock mechanism 90. Another applicable procedure may determine the gear engagement when the rotational angle α of the ring gear shaft 32a is kept unchanged at or close to a certain angle that expects gear engagement in the parking lock mechanism 90. In the latter case, one applicable procedure may calculate a rotational angle αp from a rotational position θp of the rotating shaft of the parking gear 92 detected by a rotational position detection sensor (not shown) and determine the gear engagement when the calculated rotational angle αp is kept unchanged at or close to a certain angle that expects gear engagement in the parking lock mechanism 90.

Figure 7:
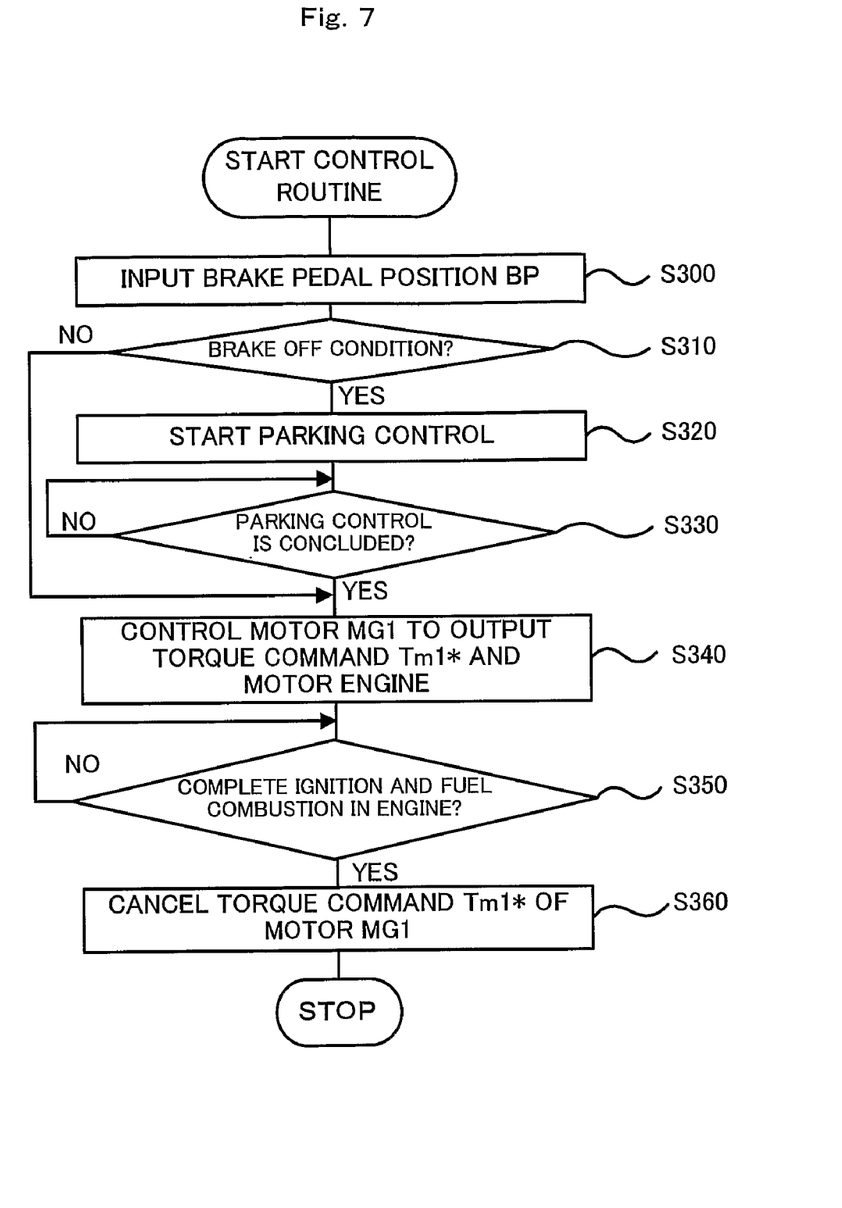
FIG. 7 is a flowchart showing a start control routine executed by the hybrid electronic control unit.

In the hybrid vehicle 20 of the embodiment, gears are engaged in the parking lock mechanism 90 in response to the driver's gearshift operation of the gearshift lever 81 to the P position. The gear engagement in the parking lock mechanism 90 may be attained at a desired timing after the driver's gearshift operation of the gearshift lever 81 to the P position, for example, in response to a start command of the engine 22 or prior to a start command of the engine 22. The engine start control to attain gear engagement in the parking lock mechanism 90 in response to a start command of the engine 22 is described below with reference to a start control routine in the flowchart of FIG. 7. The start control routine of FIG. 7 is triggered by the start command of the engine 22. In the start control routine, the CPU 72 of the hybrid electronic control unit 70 first inputs the brake pedal position BP from the brake pedal position sensor 86 (step S300) and determines whether a brake OFF condition is satisfied, based on the input brake pedal position BP (step S310). Under the brake OFF condition, the CPU 72 starts the processing of and after step S120 in the parking control routine of FIG. 2 (step S320). On conclusion of the parking control routine of FIG. 2 (step S330), the CPU 72 controls the motor MG1 to output a torque command Tm1* and motor the engine 22 (step S340) and waits for complete ignition and fuel combustion in the engine 22 (step S350). The engine start control routine cancels the torque command Tm1* of the motor MG1 (step S360) and is terminated. Conclusion of the parking control routine of FIG. 2 is determined according to the setting of a flag. The flag has an initial value of 0 and is set to 1 on conclusion of the parking control routine. The engine 22 starts in the state of gear engagement in the parking lock mechanism 90, which is attained by the parking control routine. The gear engagement desirably prevents a reactive force of the engine motoring torque output from the motor MG1 from being applied to and rotating the ring gear shaft 32 or the drive shaft. This arrangement effectively prevents an unexpected motion of the vehicle at a start of the engine 22. Under the brake ON condition at step S310, that is, while the driver steps on the brake pedal 85, it is determined that there is no unexpected motion of the vehicle at a start of the engine 22. The start control routine then skips the parking control routine and immediately goes to the processing of steps S340 to S360 to start the engine 22.

In the hybrid vehicle 20 of the embodiment, the motor MG2 is controlled to sequentially output the preset negative torque T1 and the preset positive torque T2. The gears are accordingly engaged in the parking lock mechanism 90 during rotation of the parking gear 92 by an angle corresponding to half a tooth in the backward direction of the vehicle or during subsequent rotation of the parking gear 92 by an angle corresponding to one tooth in the forward direction of the vehicle. In one possible modification, the motor MG3 in combination with the motor MG2 is controlled to sequentially output the preset negative torque T1 and the preset positive torque T2.

The hybrid vehicle 20 of the embodiment includes the motor MG3 that outputs power to the rear wheels 66a and 66b. The motor MG3 may, however, be omitted from the configuration of the hybrid vehicle.

Figure 8:
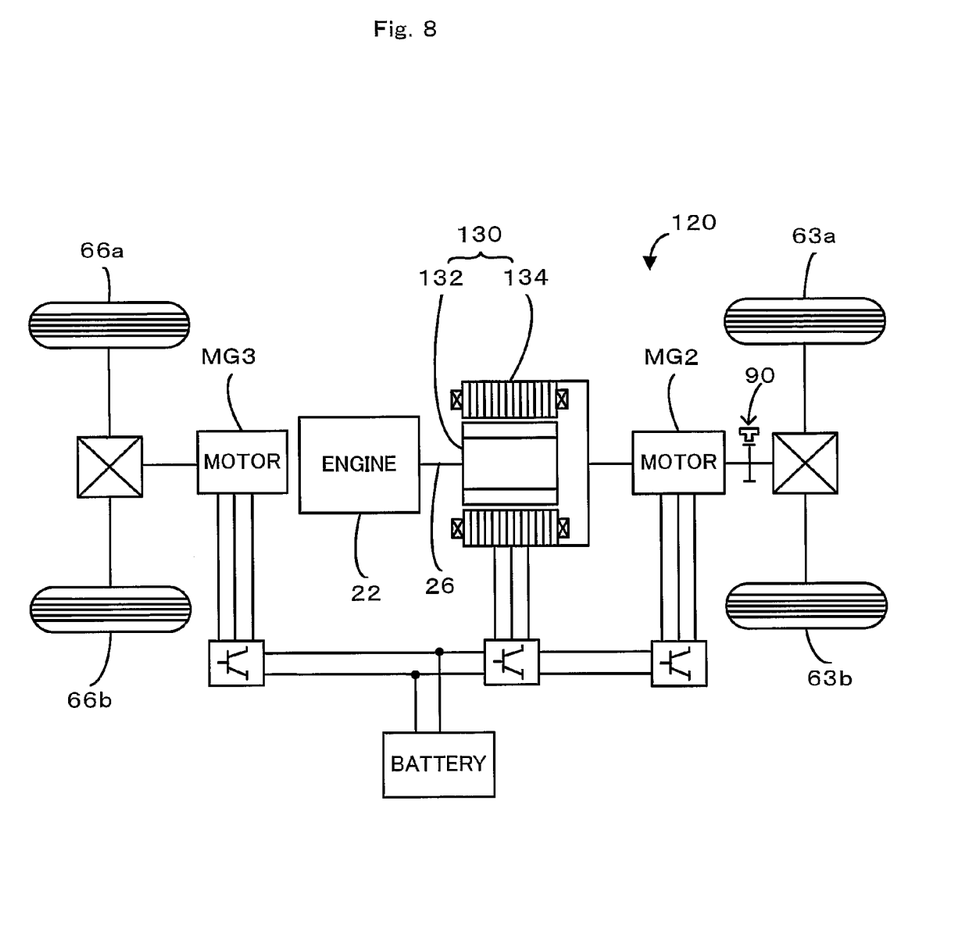
FIG. 8 schematically illustrates the configuration of another hybrid vehicle in one modified example.

In the hybrid vehicle 20 of the embodiment, the output power of the engine 22 is transmitted to the front wheels 63a and 63b via the power distribution integration mechanism 30. The technique of the invention is also applicable to a hybrid vehicle 120 of a modified structure shown in FIG. 8. The hybrid vehicle 120 is equipped with a pair rotor motor 130, which includes an inner rotor 132 connected to the crankshaft 26 of the engine 22 and an outer rotor 134 mechanically linked to the front wheels 63a and 63b. The pair rotor motor 130 transmits part of the output power of the engine 22 to the front wheels 63 and 63b, while converting the residual engine power into electric power. In the hybrid vehicle 20 of the embodiment and its modified examples, the power of the engine 22 is output to the front wheels 63a and 63b. The technique of the invention is also applicable to another modified structure of the hybrid vehicle where the power of the engine 22 is output to the rear wheels 66a and 66b.

The embodiment regards the hybrid vehicle, where the power of the internal combustion engine and the power of the first motor are output to the first axle, while the power of the second motor is output to the second axle. The technique of the invention is not restricted to the hybrid vehicles of such configurations but is also applicable to electric vehicles without an internal combustion engine. In the application of the electric vehicles, for example, the power of the first motor may be output to the first axle, while the power of the second motor may be output to the second axle. In another example, the power of one motor may be output to either the first axle or the second axle.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The present invention is preferably applicable to automobile manufacturing industries.

The invention claimed is:
1. A motor vehicle, comprising:
a motor that outputs power to drive said motor vehicle;
a locking mechanism comprising a first gear that is directly or indirectly linked to a specific axle of said motor vehicle and rotates with rotation of the specific axle, and a second gear that engages with the first gear and locks the specific axle in a non-rotatable state, the locking mechanism configured to cause second gear to engage with the first gear in response to a driver's gearshift operation of a gearshift lever to a parking position; and
a parking control module configured to execute a parking control after the driver's gearshift operation of the gearshift lever to the parking position, the parking control configured to control the motor to sequentially output a torque for moving said motor vehicle in one of forward and backward directions by or over a first distance and a torque for moving said motor vehicle in the other of the forward and backward directions by or over a second distance.

2. A motor vehicle in accordance with claim 1, wherein said parking control module executes the parking control with settings of a distance corresponding to half a tooth of the first gear and a distance corresponding to one tooth of the first gear to the first distance and to the second distance.

3. A motor vehicle in accordance with claim 1, wherein said parking control module executes the parking control with settings of a preset torque for a predetermined first time period and the preset torque for a predetermined second time period to the torque for moving said motor vehicle by or over the first distance and to the torque for moving said motor vehicle by or over the second distance.

4. A motor vehicle in accordance with claim 1, wherein said parking control module detects a lock of the specific axle by engagement of the first gear with the second gear during execution of the parking control and terminates the parking control in response to detection of a lock of the specific axle.

5. A motor vehicle in accordance with claim 4, said motor vehicle further comprising:
a vehicle speed measurement unit that measures a vehicle speed of said motor vehicle, wherein said parking control module detects the lock of the specific axle when the vehicle speed measured by the vehicle speed measurement unit decreases below a preset reference level during output of the torque for moving said motor vehicle by or over the first distance or during output of the torque for moving said motor vehicle by or over the second distance.

6. A motor vehicle in accordance with claim 4, said motor vehicle further comprising:
a rotational angle detection unit that detects a rotational angle of a drive shaft, which is connected to either the specific axle or a different axle from the specific axle,
wherein said parking control module detects the lock of the specific axle when the rotational angle of the drive shaft detected by the rotational angle detection unit is kept unchanged in a preset angle range during output of the torque for moving said motor vehicle by or over the first distance or during output of the torque for moving said motor vehicle by or over the second distance.

7. A motor vehicle in accordance with claim 1, wherein said parking control module executes the parking control after the driver's brake off operation subsequent to the driver's gearshift operation of the gearshift lever to the parking position.

8. A motor vehicle in accordance with claim 1, said motor vehicle further comprising:
a second motor that outputs power to a different axle from the specific axle of receiving the power output from the motor,
wherein said parking control module executes the parking control to control the second motor, instead of the motor.

9. A motor vehicle in accordance with claim 1, said motor vehicle further comprising:
a second motor that outputs power to a different axle from the specific axle of receiving the power output from the motor,
wherein said parking control module executes the parking control to control the second motor, in addition to the motor.

10. A motor vehicle in accordance with claim 1, said motor vehicle further comprising:
an internal combustion engine;
an electric power-mechanical power input output mechanism that is connected to an output shaft of the internal combustion engine and to a drive shaft linked with either the specific axle of said motor vehicle or a different axle from the specific axle and outputs at least part of power of the internal combustion engine to the drive shaft through input and output of electric power and mechanical power; and
a start control module that, in response to a start command of the internal combustion engine, controls the electric power-mechanical power input output mechanism and the internal combustion engine to start the internal combustion engine with output of power from the electric power-mechanical power input output mechanism,
wherein said parking control module executes the parking control, prior to a start of the internal combustion engine by said start control module.

11. A motor vehicle in accordance with claim 10, wherein the electric power-mechanical power input output mechanism comprises:
a three shaft-type power input output module that is linked to three shafts, that is, the output shaft of the internal combustion engine, the drive shaft, and a third shaft, and automatically determines power input from and output to a residual one shaft based on powers input from and output to any two shafts among the three shafts; and
a generator that inputs and outputs power from and to the third shaft.

12. A motor vehicle in accordance with claim 10, wherein the electric power-mechanical power input output mechanism comprises a pair-rotor motor that has a first rotor connected to the output shaft of the internal combustion engine and a second rotor connected to the drive shaft and is driven through relative rotation of the first rotor to the second rotor.

13. A motor vehicle in accordance with claim 1, said motor vehicle further comprising:
an internal combustion engine;
an electric power-mechanical power input output mechanism that is connected to an output shaft of the internal combustion engine and to a drive shaft linked with either the specific axle of said motor vehicle or a different axle from the specific axle and outputs at least part of power of the internal combustion engine to the drive shaft through input and output of electric power and mechanical power; and
a start control module that, in response to a start command of the internal combustion engine, instructs said parking control module to execute the parking control and controls the electric power-mechanical power input output mechanism and the internal combustion engine after conclusion of the parking control to start the internal combustion engine with output of power from the electric power-mechanical power input output mechanism.

14. A motor vehicle in accordance with claim 13, wherein the electric power-mechanical power input output mechanism comprises:
a three shaft-type power input output module that is linked to three shafts, that is, the output shaft of the internal combustion engine, the drive shaft, and a third shaft, and automatically determines power input from and output to a residual one shaft based on powers input from and output to any two shafts among the three shafts; and
a generator that inputs and outputs power from and to the third shaft.

15. A motor vehicle in accordance with claim 14, wherein the electric power-mechanical power input output mechanism comprises a pair-rotor motor that has a first rotor connected to the output shaft of the internal combustion engine and a second rotor connected to the drive shaft and is driven through relative rotation of the first rotor to the second rotor.

16. A control method of a motor vehicle, said motor vehicle comprising: a motor that outputs power to drive said motor vehicle; and a locking mechanism comprising a first gear that is directly or indirectly linked to a specific axle of said motor vehicle and rotates with rotation of the specific axle, and a second gear that engages with the first gear and locks the specific axle in a non-rotatable state, the locking mechanism causing the second gear to engage with the first gear in response to a driver's gearshift operation of a gearshift lever to a parking position,
said control method executing a parking control after the driver's gearshift operation of the gearshift lever to the parking position, the parking control controlling the motor to sequentially output a torque for moving said motor vehicle in one of forward and backward directions by or over a first distance and a torque for moving said motor vehicle in the other of the forward and backward directions by or over a second distance.

17. A control method in accordance with claim 16, wherein the parking control is executed with settings of a distance corresponding to half a tooth of the first gear and a distance corresponding to one tooth of the first gear to the first distance and to the second distance.

18. A control method in accordance with claim 16, wherein the parking control is executed with settings of a preset torque for a predetermined first time period and the preset torque for a predetermined second time period to the torque for moving said motor vehicle by or over the first distance and to the torque for moving said motor vehicle by or over the second distance.

19. A control method in accordance with claim 16, said control method comprising the step of:

detecting a lock of the specific axle by engagement of the first gear with the second gear during execution of the parking control and terminating the parking control in response to detection of a lock of the specific axle.

* * * * *